Sept. 4, 1923.
J. S. REYNOLDS
TAKE-UP FOR LEVERS
Filed May 31, 1922
1,467,012
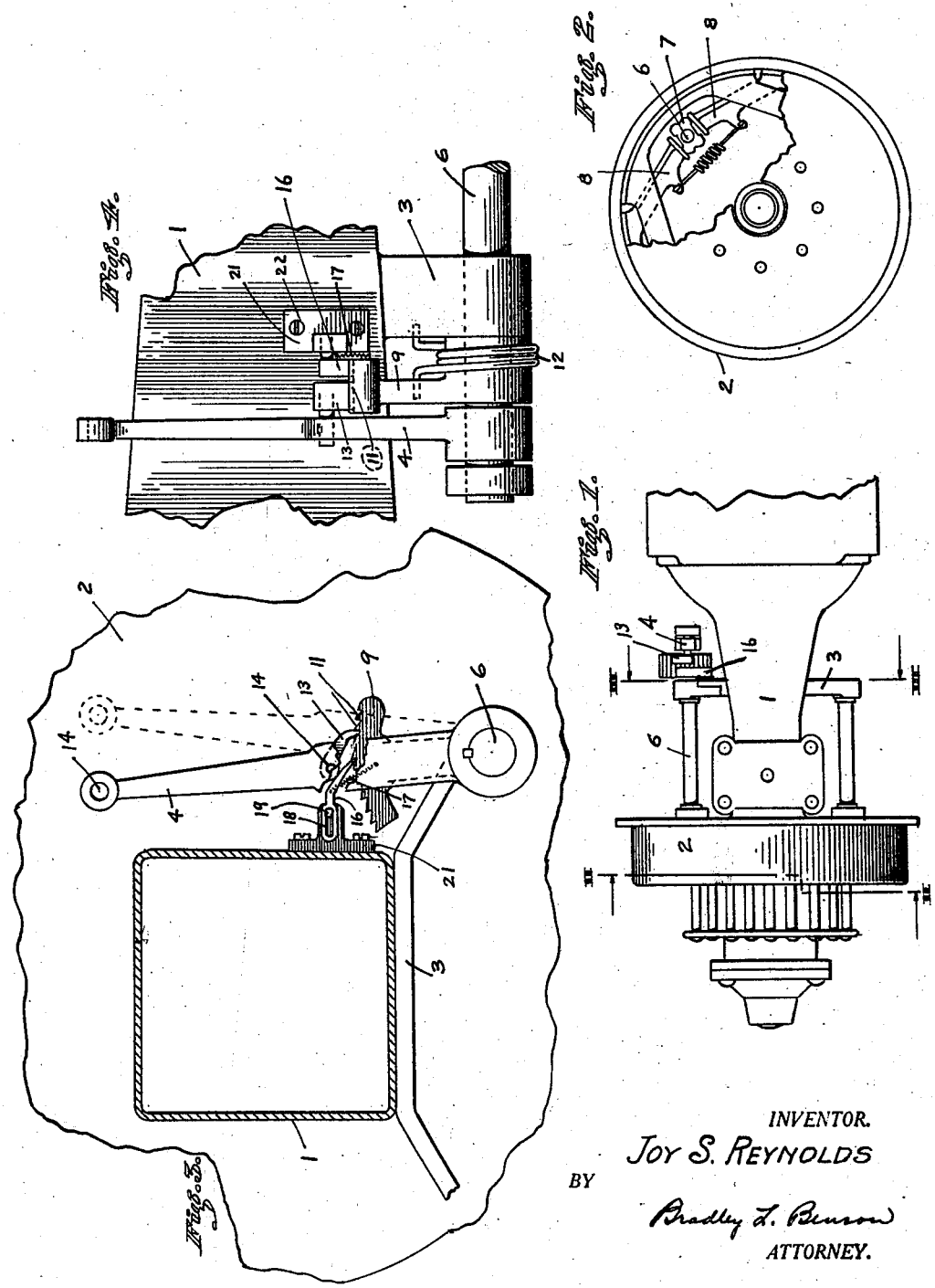
INVENTOR.
Joy S. Reynolds
BY
Bradley L. Benson
ATTORNEY.

Patented Sept. 4, 1923.

1,467,012

UNITED STATES PATENT OFFICE.

JOY S. REYNOLDS, OF SAN FRANCISCO, CALIFORNIA, ASSIGNOR OF ONE-HALF TO CHARLES A BALCOM, OF SAN FRANCISCO, CALIFORNIA.

TAKE-UP FOR LEVERS.

Application filed May 31, 1922. Serial No. 564,985.

*To all whom it may concern:*

Be it known that I, JOY S. REYNOLDS, a citizen of the United States of America, residing at 1234 Jackson Street, San Francisco, in the county of San Francisco and State of California, have invented certain new and useful Improvements in Take-Ups for Levers, of which the following is a specification.

The present invention is an improved automatic take-up for levers pivoted for a limited oscillation as, for instance, the operating levers commonly used to apply brakes on automobile wheels.

The objects of this invention include:

(1) Provision of means for automatically accumulating or compensating for lost motion due to wear of parts controlled by the levers used.

(2) Means for causing the oscillative movement of the levers through a fixed arc or limit of travel to preserve a desired relative position of the parts actuated and the controls therefor.

(3) The provision, in connection with the brake system of an automobile, of means actuated by the brake control levers or pedals, whereby those levers or pivoted parts which apply the brake elements will move continuously through a definite arc irrespective of wear of brake lining or any like cause which might render the brake application ineffective after a time. By the means hereinafter described the wear or lost motion is taken up automatically by the repeated operation of the controls without materially altering the limit of throw thereof or necessitating additional movement of the foot pedal or hand lever.

In this specification and the annexed drawings, the invention is illustrated in the form considered to be the best, but it is to be understood that the invention is not limited to such form, because it may be embodied in other forms, and it is also to be understood that in and by the claim following the description it is desired to cover the invention in whatever form it may be embodied.

In the accompanying 1 sheet of drawings, Fig. 1 is a top plan view of a typical form of rear axle of an automobile and fragment of axle housing, and showing the levers which apply brakes.

Fig. 2 is a section of Fig. 1 taken on the line II—II looking in the direction of the arrow.

Fig. 3 is an enlarged section of Fig. 1 taken on the line III—III looking in the direction of the arrows, and Fig. 4 is a side elevation of Fig. 3.

Referring to the drawings, Fig. 1, the numeral 1 indicates an axle housing and 2 the brake drum of a wheel mounted on an axle extending through said housing. At 3, I show a bracket secured to the axle housing and supporting a lever 4, oscillably mounted on a shaft 6 revoluble in bracket 3.

The shaft 6 extends into the brake drum and carries, at the end remote from lever 4 a cam 7, Fig. 2, which expands brake shoes 8.

All the structure so far described is conventional and forms no part of the present invention.

Also mounted on shaft 6 and keyed thereto is a sector 9 provided with ratchet teeth 11.

The sector 9 and lever 4 are normally retracted or urged toward the housing 1 by a coil spring 12 surrounding the shaft 6 and bearing at one end against the bracket 3 and at the opposite end against the sector 9.

The urge of spring 12 is transmitted to the lever 4 because of the engagement with the ratchet teeth 11 of the sector 9 and a pawl 13 pivoted at 14 to the lever 4.

When a pull is exerted on lever 4 against said spring 12 as by a pull rod (not shown) connected with an eye 14 in lever 4, the engagement of pawl 13 with the ratchet on sector 9 causes said sector to move with the lever 4 as it applies the brakes.

Also engaged with ratchet teeth 11 is the point of a pawl 16. This pawl is normally kept in engagement with the ratchet by a tension spring 17 secured at one end to the pawl and at the other to the sector 9.

The end of pawl 16 remote from the point is provided with a slot 18 through which extends a stud 19 protruding from a bracket or lug 21 secured as by screws 22 to housing 1.

The length of slot 18 determines the permissible degree of oscillation of lever 4. As the lever 4 is moved to braking position (shown in dotted lines, Fig. 3) the pawl 16 moves with it and the slot 18 travels over pin 19 without any movement of the point of the pawl relative to the sector 9.

If, for any reason such as wear of brake bands, the lever 4 could be rotated beyond the point where the end of slot 18 encounters pin 19, the spring pressed pawl 16, which is stopped at that point, would ride over a tooth of ratchet 11 and engage the next tooth.

On the return movement of lever 4 when the opposite end of slot 18 is engaged by pin 19, the further movement of the sector 9 is obstructed, and the continued movement of lever 4 to its neutral or release position will cause the spring pressed pawl 13 to ride over a notch 11 and engage a new tooth in the ratchet, which cooperative movement compensates for the loss of movement due to worn parts.

It is obvious that the parts described might be doubled if two sets of brake shoes were employed. For simplicity, only one equipment has been shown and described.

I claim:—

1. A take-up, comprising, in combination, a lever, a mechanism operated thereby, an oscillable member between said parts, means applied between said lever and said member adapted to communicate motion of one of said parts to the other in one direction only, but not in the other.

2. A take-up, comprising, in combination, a lever, a mechanism operated thereby, an oscillable member between said parts, means applied between said lever and said member adapted to convey motion of one of said parts to the other in one direction only, but not in the other, and means adapted to prevent a reverse motion of the moved part.

3. A take-up, comprising, in combination, a lever, a mechanism operated thereby, an oscillable member between said parts, means connecting said lever and said member adapted to convey motion of one of said parts to the other in one direction only, but not in the other, means adapted to prevent a reverse motion of the moved part, said last named means provided with stops adapted to permit a limited movement thereof.

4. A take-up, comprising, in combination, a lever, a mechanism operated thereby, an oscillable sector between said parts, a pawl on said lever, ratchet teeth on said sector engaged by said pawl, and adapted to oscillate it in one direction and leave it free in the reverse direction.

5. A take-up, comprising, in combination, a lever, a mechanism operated thereby, an oscillable sector, a pawl on said lever engaging ratchet teeth on said sector and adapted to oscillate it in one direction and leave it free in the reverse direction and a second pawl connected to a fixed point and adapted to prevent a reverse movement.

6. A take-up, comprising, in combination, a lever, and a mechanism operated thereby, an oscillable toothed sector, a pawl on said lever engaging said teeth, a second pawl connected to a fixed part, said second pawl having a variable pivotal point.

In testimony whereof I affix my signature.

JOY S. REYNOLDS.